Oct. 10, 1950  W. H. MAYNE  2,524,985
NOISE-LEVEL RESPONSIVE AMPLIFIER
Filed March 26, 1946  2 Sheets-Sheet 2
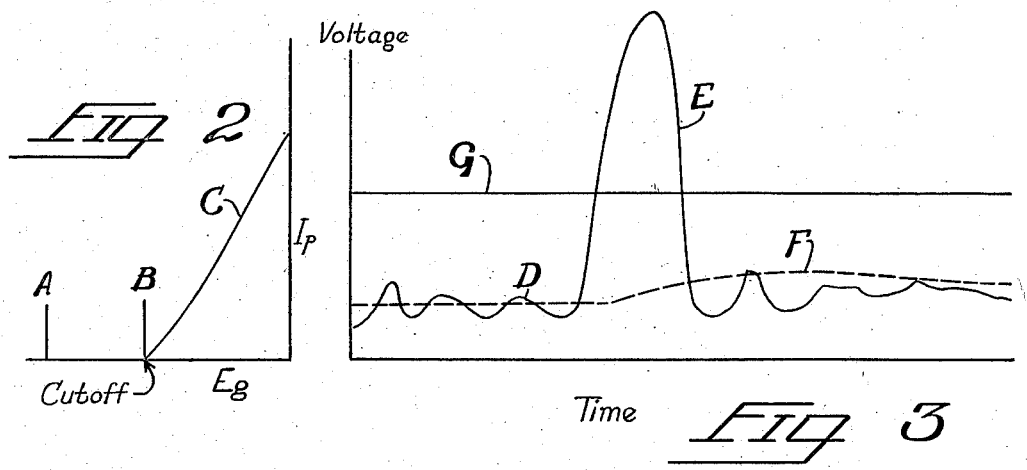
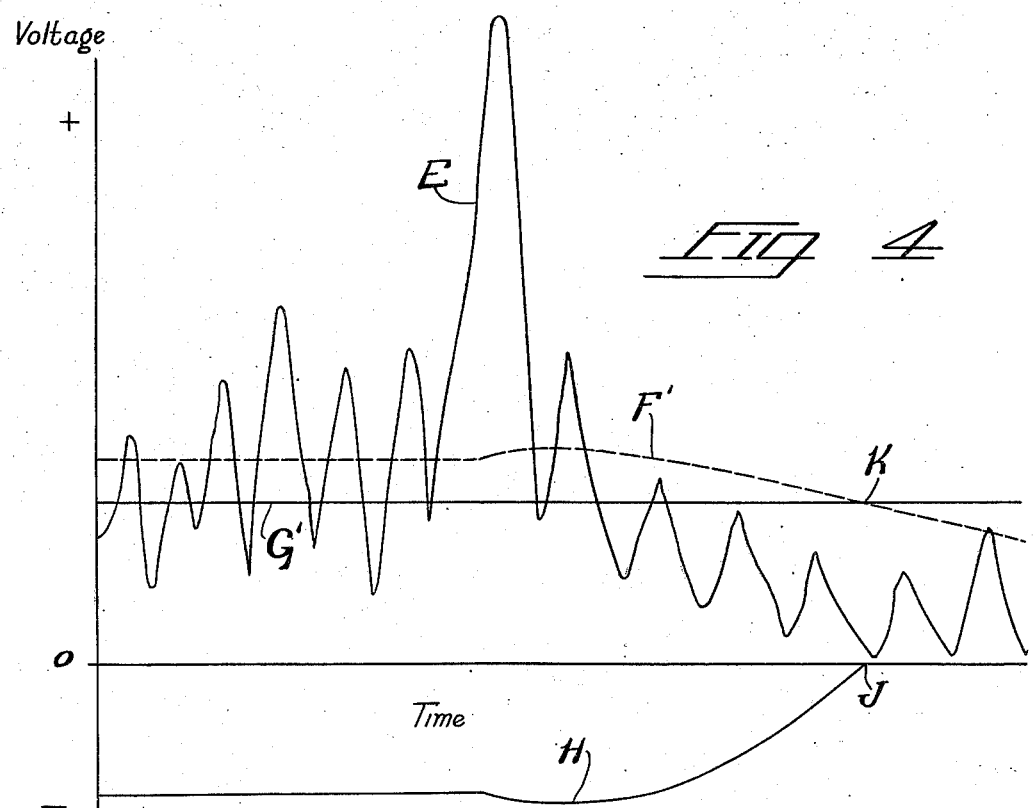
INVENTOR.
William Harry Mayne
BY
Watson, Cole, Grindle & Watson
ATT'ys.

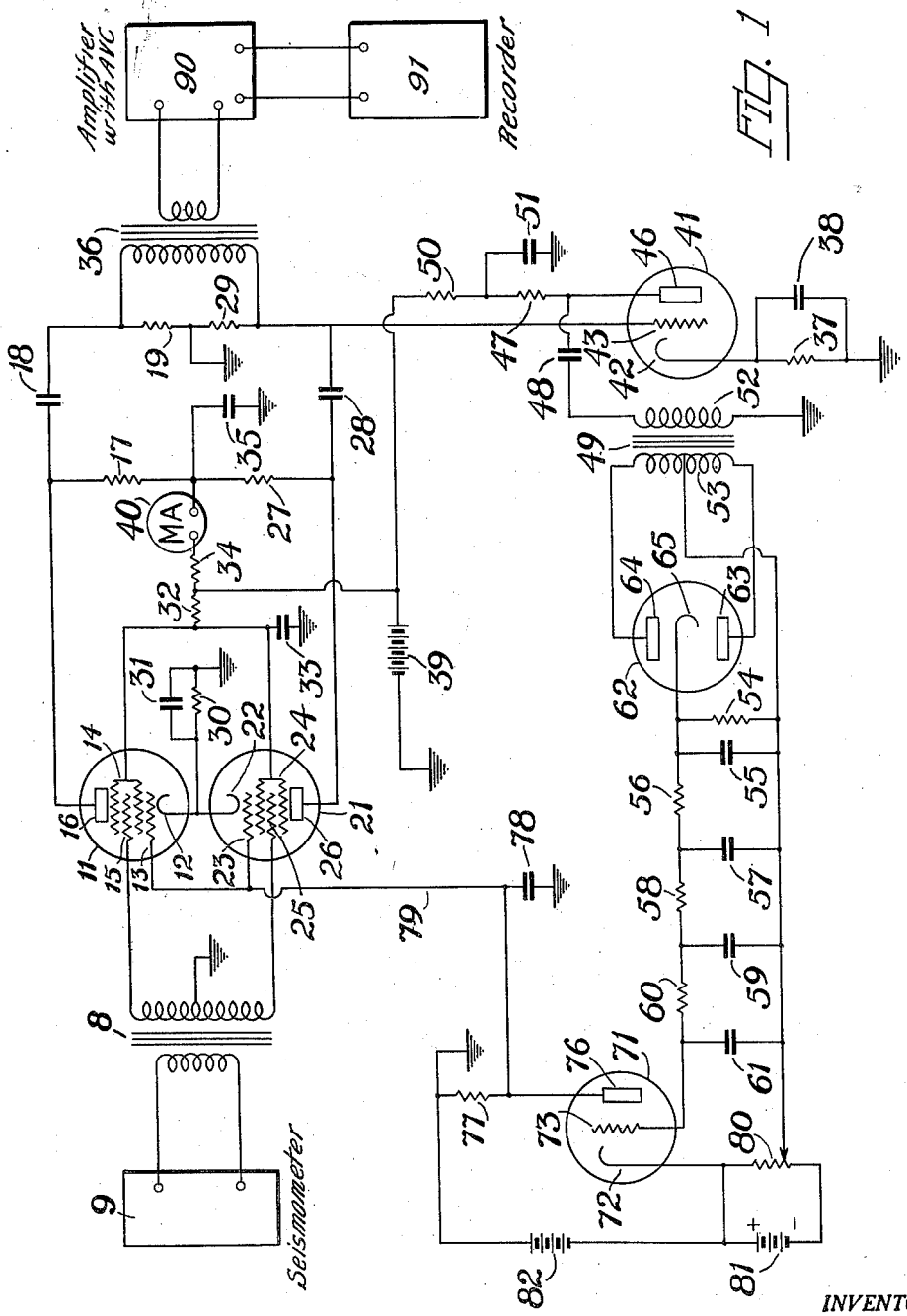

Patented Oct. 10, 1950

2,524,985

UNITED STATES PATENT OFFICE 2,524,985

NOISE-LEVEL RESPONSIVE AMPLIFIER

William Harry Mayne, San Antonio, Tex., assignor to Olive S. Petty, San Antonio, Tex.

Application March 26, 1946, Serial No. 657,168

12 Claims. (Cl. 179—171)

This invention relates to methods of and apparatus for conducting seismic surveys for use in connection with geophysical prospecting, and more particularly to apparatus and methods for recording the seismic wave trains as they arrive at one or more reception points.

It is a general object of the present invention to provide novel and improved apparatus for and methods of recording the arrival times of waves which are received over a period of several seconds and which exhibit during that time various intensities or amplitudes, the ratio of the highest to the lowest amplitude being relatively large.

Thus it is well recognized that certain higher energy waves may be received with an intensity of the order of six hundred times that of other waves, and that during a period following the reception of waves of high amplitude, the wave form energy is gradually attenuated, usually decaying rather uniformly with time. In order that waves of widely varying amplitude may all be received and recorded on a record sheet or other medium of convenient dimensions, it is desirable that provision be made to bring the waves, or energy derived therefrom, to levels not greatly differing throughout the total time of wave reception.

Conventional seismic equipment therefore ordinarily includes devices functioning automatically to regulate and control the amplitude of the recorded signal for the purpose of compensating, at least in part, for the wide variation in amplitude of seismic wave trains; such devices are commonly called automatic volume controls. For instance, there is shown in the patent to Parr, Jr., 2,352,494, granted June 27, 1944, an improved form of automatic volume control employing, in addition to certain novel features, certain basic features which are now regarded as conventional in this field. Thus the signal energy is fed into a thermionic valve amplifier with which is associated an automatic volume control circuit. Whenever the signal energy exceeds a predetermined amplitude, as it ordinarily does during the early part of the record, a separate thermionic valve or automatic volume control valve is rendered operative. The output of the automatic volume control valve is supplied through a time-delay circuit or filter network to a grid of one of the amplifier valves so as to apply to the grid a negative charge or bias voltage which reduces the amplification or gain of the amplifier valve. The time-delay or filter network consists of one or more condensers shunted by resistances, the condensers being charged on energization of the automatic volume control valve, and being gradually discharged through the resistances, so that the bias applied to the amplifier valve grid through the filter network is gradually reduced to permit gradual increase in amplification. In this manner the attenuation or gradual decay of the wave train with time, hereinbefore mentioned, is compensated at least in part by gradual increase in the gain of the amplifier. The characteristics of such a filter network are conventionally so selected that the draining of the charge applied to the condensers is completed well before the end of the record, so that the amplifier gain is returned to the maximum value during the recording of the signal energy. It will be noted that the sequence of operations in an automatic control of this character is essentially as follows:

1. Part of the signal energy is supplied to the grid of the automatic volume control valve, the valve being initially biased beyond cut-off so that no current flows in the valve unless and until the signal energy exceeds a predetermined value, known as the threshold value.

2. Signal energy in excess of the threshold value is rectified by the automatic volume control valve, and the rectified signal is supplied to the time-delay circuit or filter network, charging the network condensers.

3. The charge on the condensers is applied to a grid of one or more amplifier valves to reduce the gain of the amplifier, this charge draining off before the end of the record so that the amplifier gain is gradually restored to maximum.

I have discovered that in the interest of clarity and in order to facilitate interpretation of a seismic record, it is important to effect control of the amplifier gain independently of the level of signal energy in such manner that the gain is reduced whenever the extraneous or background noise becomes excessive. In the reception of seismic signals, the sensitivity of the equipment employed is very high, and disturbances other than the signal energy frequently reach such a level that reduction of gain of the amplifier is desirable.

It is therefore proposed, as a part of the present invention, to provide a seismic amplifier with means responsive to increase in noise level above a predetermined level to reduce the amplifier gain. It is a feature of the invention that the time-delay or filter network included in such a gain control circuit is operative to retain the controlling charge supplied thereto for a period of time much longer than that required to complete the record, for example a period of the order of several times the duration of the record.

Specifically, it is proposed by the present invention to first rectify and filter the controlling energy, and thereafter to supply the rectified and filtered energy to the automatic volume control valve. Thus it is possible, by employing a time-delay circuit or filter network having an unusually long time constant, and by proper selection of the normal grid bias on the automatic volume control valve, to insure that the valve will not become operative to supply a controlling bias to the grid of the amplifier valve until the level of the received background noise exceeds a predetermined permissible value. Peak signal energy, being usually of short duration, does not materially affect the operation of such a system, which may therefore be properly described as responsive to the noise level.

Such a system has many advantages. Thus if the overall gain of the amplifier is regulated manually by the operator, it is always possible that through inexperience or carelessness the gain may be so high that the record may show excessive noise, obscuring from the operator, or the computer, the need for a larger explosive charge. When the signal output of the amplifier is transmitted by radio, as is often the case, it is especially desirable to reduce the gain to such a point that the background noise has little or no effect on the transmitter, so that the full modulation capabilities of the transmitter will be available for the transfer of seismic energy rather than of meaningless noise. By the use of the circuit described herein, the amplifier gain is automatically established to provide the maximum usable sensitivity, which is obviously highly desirable.

Furthermore, it is important in the reading of seismic records to establish the precise instant at which the primary wave, representing the first arrival of signal energy, is received. In refraction surveying this is frequently the only item of interest. The instant of arrival of the primary wave can best be determined when the recorder is quiet before such arrival, and the circuit described herein may be employed to advantage for this purpose.

Since it is desirable, especially in reflection surveying, so to control the amplifier gain as to reduce the gain on arrival of signal energy of excessive amplitude, the instant invention contemplates the use of the system of control herein described in conjunction with a conventional, signal energy responsive system. This dual control may be obtained by the use of separate automatic volume control circuits, each circuit being fed with a portion of the received energy and functioning to supply to a grid of a valve amplifier a biasing potential, whereby the gain of the amplifier is appropriately altered. Each such circuit may be connected to control more than one amplifier grid, the signal responsive circuit being applied to control a later stage, or the respective circuits may be connected to separate grids in the same valve amplifier, these being obvious alternative expedients.

These and other objects and features of the invention will be apparent from the following description taken in connection with the accompanying drawings, in which Figure 1 is a wiring diagram of apparatus for receiving, amplifying, and recording seismic energy, illustrating one method of practicing the invention;

Figure 2 is a graph illustrating voltage-current characteristics of the automatic volume control valve, shown at 71 in Figure 1; and Figures 3 and 4 are graphical representations of the variation with time of voltages which may exist at specified points in the circuit.

In order to facilitate an understanding of the invention, reference is made to the embodiment thereof illustrated in the accompanying drawings, and detailed descriptive language is employed. It will nevertheless be understood that no limitation of the scope of the invention is thereby intended, and that various further modifications and alterations, such as would occur to one skilled in the art, may be made without departing from the principles of the invention.

Referring now to Figure 1 of the drawing, it will be observed that the circuit selected for the purpose of illustrating the invention includes a seismometer 9, an amplifier 90, preferably having the usual signal responsive automatic volume control and filter, and a recorder 91. Since these elements may be conventional and the details thereof form no part of the instant invention, they are shown only diagrammatically. The novel form of volume control with which the instant invention is more particularly concerned is illustrated in detail.

Thus the seismic disturbances are converted by one or more seismometers 9 into electrical wave form energy which is supplied to a transformer 8, the output of the transformer being fed to the grids 15 and 25 of valves 11 and 21, respectively. These valves are normally biased by resistance 30, connected between ground and the cathodes 12 and 22 of the respective valves, the resistance being by-passed by a condenser 31 of substantial capacity. The voltage for the screen grids 14 and 24 of the valves is derived from battery 39 through a decoupling resistor 32, the resistor and battery being by-passed to ground through condenser 33. The anodes 16 and 26 of the valves are supplied with anode voltage from battery 39 through resistor 34, milliammeter 40, indicating amplifier gain, and resistors 17 and 27, respectively, a decoupling condenser 35 being provided. The output of the valves is supplied to the primary winding of transformer 36 through coupling condensers 18 and 28, high impedance resistors 19 and 29, connected between ground and the winding terminals, serving to maintain the winding at substantially the D. C. potential of the ground. The secondary of the transformer 36 is connected through amplifier 90 to recorder 91. The amplifier 90 may be constructed as shown in the prior patent to Parr 2,352,494, hereinbefore mentioned, or the patent to Parr 2,390,322 granted December 4, 1945, or other systems of thermionic valve amplification employing signal energy responsive automatic volume control may be used. The recorder 91 may be of the well known multiple string galvanometer type, each string being connected for actuation by the amplified output from one seismometer or from one group of seismometers. The seismometer 9 may be of the capacitive type, for example as shown in the patent to Petty 2,357,356 granted September 5, 1944. The details of these elements of the system, as well as the details of the amplifying circuit comprising the valves 11 and 21, may be altered widely.

The preferred method of controlling the amplification or gain of valves 11 and 21 will now be described by reference to the remaining illustrated structure. Part of the energy being amplified is applied to the grid 43 of valve 41, for instance by connecting the grid to one terminal of the primary winding of the transformer 36. Anode 46 of valve 41 is supplied with anode voltage from battery 39 through resistors 50 and 47, the former being by-passed to ground by condenser 51. The cathode 42 of valve 41 is biased by resistor 37, by-passed by condenser 38, the value of the resistor being so chosen as to afford the desired amount of amplification.

The output of valve 41 is fed through coupling condenser 48 to the primary winding 52 of transformer 49, the terminals of the secondary winding 53 being connected to anodes 63 and 64 of rectifier valve 62, the cathode 65 of the rectifier being returned to the center tap of winding 53 through resistor 54. It will be observed that no initial bias is applied to this circuit, valve 62 functioning merely as a full-wave rectifier. Thus as soon as a voltage appears across winding 53, it is rectified and applied as a pulsating D. C. voltage across resistor 54. Full wave rectification at this point is not essential but is in many respects desirable.

The pulsating voltage applied to resistor 54 is passed through a filter network or time-delay circuit comprising resistors 56, 58, and 60 and condensers 55, 57, 59 and 61. While this circuit is illustrated as comprising the several sections represented by the named elements, this is not essential, it being necesary for the proper practice of the invention only so to select the several elements as to provide a time constant which is unusually high, being greater than and preferably several times the duration of the seismic record, which is normally about two seconds. The output of the filter network is applied to the grid 73 of the automatic volume control valve 71.

As hereinbefore pointed out, I am enabled by the use of a network having a long-time constant to render the automatic volume control operable in response to undesirable increase in noise level, but substantially inoperable in response to the shorter pulses of high amplitude signal energy. It will also be noted that since the rectification and filtering of the energy is effected in that part of the circuit which precedes the automatic volume control valve, peaks of energy of short duration are absorbed in the filter network, and are not directly applied to the valve, as in the conventional circuits. Furthermore, the time required for the controlling charge to drain from the automatic volume control valve may be made appreciably smaller than the conventional automatic volume control with the same filtering action, because the time-delay circuit, from which the charge on the condenser network drains slowly, precedes the valve with the threshold. This is possible since the voltage on the filter condenser 61 has to drop only to a finite value (the threshold) rather than to zero as is the case in the conventional automatic volume control.

The source 82 of anode voltage supply is connected to anode 76 through resistor 77. Valve 71 is normally biased substantially beyond cutoff by battery 81, the bias voltage being so adjusted by potentiometer 80 that the automatic volume control valve 71 remains inoperative until the voltage applied to the grid 73 by the filter network attains that voltage which is produced when the noise level of the received seismic energy is undesirably high. To state the matter otherwise, the bias is so selected that valve 71 is biased beyond cutoff by an amount equal to the average value of the output voltage of the filter network (the voltage appearing across condenser 61) when the maximum allowable noise exists at transformer 36. Whenever the rectified and filtered voltage appearing across condenser 61 increases beyond this predetermined value, anode current will be delivered by valve 71. Such anode current passes through resistor 77 to ground, and the voltage drop in the resistor applies a charge to condenser 78 and a negative voltage to lead 79 and thence to grids 13 and 23 of valves 11 and 21, respectively, thereby reducing the gain of these valves. The values selected for resistor 77 and condenser 78 are such as to maintain the controlling charge for the desired period of time, and as heretofore mentioned, this may be less than that required in conventional automatic volume control circuits.

In Figure 2 is shown the characteristics of the automatic volume control valve 71, anode current being plotted against grid voltage. It will be observed that the valve is normally biased to point A, cutoff being indicated at B. When the voltage supplied by the filter network is sufficiently high, the valve is rendered operative and the anode current increases substantially in proportion to further increase in anode voltage, as shown by curve C.

In Figure 3 is illustrated at D the voltage appearing across resistor 54 (the input to the filter network) during the taking of a portion of a seismic record, voltage being plotted against time. It will be observed that the sudden increase in this voltage represented at E, caused by a burst of high amplitude signal energy, is not reflected by any comparably large increase in the voltage applied across condenser 61 (the filter network output) represented by curve F, owing to the large capacity of the filter network. Thus in this graph the voltage applied to the grid of the automatic volume control valve by the filter network does not at any time exceed the bias voltage or threshold of the valve, represented by line G, and the valve remains inoperative; the line G represents that voltage which is delivered by the filter network when the maximum permissible noise level in the received energy is reached, and until that value is exceeded, the automatic volume control valve does not function. Consequently that valve is properly described as responsive only to increase in noise level above a predetermined value; sudden increase in signal energy is compensated by control of gain in the amplifier 90, through the medium of the conventional automatic volume control circuit included therein. Obviously such a conventional circuit, while conveniently applied as illustrated, may be applied to the control of gain in valves 11 and 21, the signal responsive control voltage being supplied to separate grids in these valves.

In Figure 4 is graphically illustrated at $F^1$ the actual voltage across condenser 61, at the output of the filter network, when the noise level of the energy supplied to transformer 36 exceeds a predetermined permissible level, the voltage across resistor 54, at the filter network input, being represented at $E^1$, and the threshold value of valve 71 being shown at $G^1$. The corresponding voltage applied to the grids 13 and 23 to control the gain of valves 11 and 21, respectively, is shown in this figure at H; it will be noted that following initiation of operation of automatic control valve 71, and the application of the controlling voltage to the grids 13 and 23 of the valve amplifiers, the charge on these grids falls off rapidly as soon as the automatic volume control valve ceases to function. Thus the release time constant of the whole circuit is quite short, although the time constant of the filter network is unusually long.

It will be appreciated from the foregoing that in its broader aspect the invention contemplates the employment, in a seismic amplifier of means responsive to the noise level of the received energy for controlling the amplifier gain. More specifically, the control of the gain is effected by a circuit in which the rectification and filtering of the control energy precedes the delivery of the energy to the automatic volume control valve. Again, the invention contemplates the use of an automatic volume control circuit in which the filter or time-delay network is unusually long, preferably having such capacity as to retain a substantial portion of the supplied charge for a period in excess of twice the duration of the usual seismic record.

Having thus described the invention, what is claimed as new and desired to be secured by Letters Patent is:

1. In apparatus for use in seismic surveying to amplify and record electrical wave form signals derived from seismic energy, the combination with thermionic valve means for amplifying such signals, of an automatic volume control circuit operatively associated with said amplifying means, said circuit including means for rectifying a part of the received energy, a time-delay network supplied by the energy so rectified, an automatic volume control tube having a grid normally biased beyond cut-off, and means supplying the voltage of said network to said grid, the time constant of said network being sufficiently long to limit response of the circuit essentially to variation in noise level of the received energy.

2. In apparatus for use in seismic surveying to amplify and record electrical wave form signals derived from seismic energy, the combination with thermionic valve means for amplifying such signals, of an automatic volume control circuit operatively associated with said amplifying means, said circuit including means for rectifying a part of the received energy, a time-delay network supplied by the energy so rectified, an automatic volume control tube having a grid normally biased beyond cut-off, and means supplying the voltage of said network to said grid, the time constant of said network being sufficiently long to render said circuit substantially non-responsive to abrupt changes in signal energy.

3. In apparatus for use in seismic surveying to amplify and record electrical wave signals derived from seismic energy, the combination with thermionic valve means for amplifying such signals, of an automatic volume control circuit operatively associated with said amplifying means, said circuit including means for rectifying a part of the received energy, a time-delay network supplied by the energy so rectified, an automatic volume control tube having a grid normally biased beyond cut-off, and means supplying the voltage of said network to said grid.

4. In apparatus for use in seismic surveying to amplify and record electrical wave form signals derived from seismic energy, the combination with thermionic valve means for amplifying such signals, of an automatic volume control circuit operatively associated with said amplifying means, said circuit including means for rectifying a part of the received energy, a time-delay network supplied by the energy so rectified, an automatic volume control tube having a grid normally biased beyond cut-off, and means supplying the voltage of said network to said grid, the time constant of said network being substantially longer than the duration of the seismic record.

5. In apparatus for use in seismic surveying to amplify and record electrical wave-form signals derived from seismic energy, the combination with means including thermionic valves for amplifying such signals, of an automatic volume control circuit for so varying the internal resistance of one of said valves in response to variation in amplitude of signal energy as to maintain the major portion of the record within usable amplitude limits, and a second automatic volume control circuit having a time-constant sufficiently long to render said second circuit substantially nonresponsive to abrupt changes in signal energy, said second circuit being responsive to increase in noise level of the received energy above a predetermined level for increasing the internal resistance of one of said valves.

6. In apparatus for use in seismic surveying to amplify and record electrical wave-form signals derived from seismic energy, the combination with means including thermionic valves for amplifying such signals, of means for so varying the internal resistance of at least one of said valves in response to variation in amplitude of signal energy as to maintain the major portion of the record within usable amplitude limits, and an automatic volume control circuit energized by the received energy and having a time-constant sufficiently long to render said circuit substantially nonresponsive to abrupt changes in signal energy, said circuit being responsive to increase in noise level of the received energy above a predetermined level for increasing the internal resistance of at least one of said valves.

7. In apparatus for use in seismic surveying to amplify and record electrical wave-form signals derived from seismic energy, the combination with means including thermionic valves for amplifying such signals, of means responsive to variation in amplitude of signal energy to maintain the major portion of the record within usable amplitude limits, and an automatic volume control circuit having a time-constant sufficiently long to render said circuit substantially nonresponsive to abrupt changes in signal energy, but responsive to increase in noise level of the received energy above a predetermined level for reducing the gain of said amplifying means.

8. In apparatus for use in seismic surveying to amplify and record electrical wave-form signals derived from seismic energy, the combination with means including thermionic valves for amplifying such signals, of an automatic volume control circuit operatively associated with said amplifying means and responsive to increase in noise level of the received energy above a predetermined level for increasing the internal resistance of one of said valves to reduce the gain of said amplifying means, said automatic volume control circuit including an automatic volume control tube, means supplying the output of said tube to an electrode of one of said valves, means biasing an electrode of said automatic volume control valve beyond cut-off, means for rectifying a portion of the received energy, a time-delay network supplied with the energy so rectified, and means delivering the voltage of said network to said automatic volume control tube electrode.

9. In apparatus for use in seismic surveying to amplify and record electrical wave-form signals derived from seismic energy, the combination with means including thermionic valves for amplifying such signals, of means for so varying the internal resistance of one of said valves in response to variation in amplitude of such energy as to maintain the major portion of the record within usable amplitude limits, and an automatic volume control circuit responsive to increase in noise level of the received energy above a predetermined level for increasing the internal resistance of one of said valves, said last named circuit including means for rectifying a part of the received energy, a time-delay network supplied by the energy so rectified, an automatic volume control tube having an electrode normally biased beyond cut-off, and means supplying the voltage of said network to said last named electrode, the time constant of said network being sufficiently long to limit response of the circuit essentially to variation in noise level of the received energy.

10. In apparatus for use in seismic surveying to amplify and record electrical wave-form signals derived from seismic energy, the combination with means including thermionic valves for amplifying such signals, of an automatic volume control circuit responsive to variation in signal energy for maintaining the major portion of the record within reasonable limits, an automatic volume control circuit operatively associated with said amplifying means and responsive to increase in noise level of the received energy above a predetermined level for increasing the internal resistance of one of said valves to reduce the gain of said amplifying means, said last named automatic volume control circuit including an automatic volume control tube, means supplying the output of said tube to one of said valves, means biasing said automatic volume control tube beyond cut-off, and means supplying to said automatic volume control tube rectified and filtered energy derived from the received energy.

11. In an amplifier for wave form signal energy, the combination with amplifying means, of an automatic volume control circuit operatively associated with said amplifying means, said circuit including means for rectifying a part of the received energy, a time-delay network supplied by the energy so rectified, an automatic volume control tube having an electrode normally biased beyond cut-off, and means supplying the voltage of said network to said electrode, said network having a time-constant sufficiently long to render the circuit non-responsive to high amplitude signal pulses, whereby said circuit is responsive only to undesirable increase in noise level of the received energy above a predetermined level for reducing the gain of said amplifying means.

12. In an amplifier for wave-form signal energy, the combination with amplifying means, of an automatic volume control circuit operatively associated with said amplifying means, said circuit including means for rectifying a part of the received energy, a time-delay network supplied by the energy so rectified, an automatic volume control tube having an electrode normally biased beyond cut-off, and means supplying the voltage of said network to said electrode, said network having a time-constant sufficiently long to render said circuit substantially nonresponsive to abrupt changes in signal energy.

WILLIAM HARRY MAYNE.

REFERENCES CITED

The following references are of record in the file of this patent:

UNITED STATES PATENTS

| Number | Name | Date |
|---|---|---|
| 2,008,698 | Hammond | July 23, 1935 |
| 2,112,279 | Hagenhaus | Mar. 29, 1938 |
| 2,255,683 | Singer | Sept. 9, 1941 |
| 2,261,951 | Block | Nov. 11, 1941 |
| 2,303,357 | Hoover | Dec. 1, 1942 |
| 2,303,358 | Hoover | Dec. 1, 1942 |
| 2,306,991 | Groendyke | Dec. 29, 1942 |
| 2,307,790 | Hoover | Jan. 12, 1943 |